United States Patent [19]
McCann et al.

[11] Patent Number: 4,907,843
[45] Date of Patent: * Mar. 13, 1990

[54] FLUID-PRESSURE OPERATED ANTI-SKID BRAKING SYSTEMS FOR VEHICLES

[75] Inventors: Denis J. McCann, Powys; Allan Williams; Edwin R. Carswell, both of Gwent, all of Wales; William S. Broome, Worcestershire, England

[73] Assignee: Lucas Industries public limited company, England

[*] Notice: The portion of the term of this patent subsequent to Nov. 15, 2005 has been disclaimed.

[21] Appl. No.: 228,981

[22] Filed: Aug. 5, 1988

[30] Foreign Application Priority Data

Aug. 19, 1987 [GB] United Kingdom ............... 8719550

[51] Int. Cl.4 ..................... B60T 8/64; B60T 13/70
[52] U.S. Cl. ........................... 303/111; 303/118
[58] Field of Search ............... 303/40, 57, 62, 64, 303/65, 100, 103, 110, 111, 113, 115, 118, 119, 9.61; 188/181 A

[56] References Cited

U.S. PATENT DOCUMENTS

| | | | |
|---|---|---|---|
| 3,556,615 | 1/1971 | Stelzer | 303/115 |
| 4,155,603 | 5/1979 | Harries | 303/110 |
| 4,175,795 | 11/1979 | Mortimer et al. | 303/118 |
| 4,210,370 | 7/1980 | Mortimer | 303/118 |
| 4,374,421 | 2/1983 | Leiber | 303/111 X |
| 4,714,296 | 12/1987 | Imoto et al. | 303/119 X |
| 4,733,921 | 3/1988 | Farr | 303/111 |
| 4,784,444 | 11/1988 | McCann et al. | 303/118 |

Primary Examiner—Andres Kashnikow
Assistant Examiner—Timothy Newholm
Attorney, Agent, or Firm—Laff, Whitesel, Conte & Saret

[57] ABSTRACT

Brakes (1,2; 3,4) on the wheels (5,6; 7,8) at opposite ends of a common axle are each controlled by a separate skid control unti and a single latch valve (21) common to both units closes at the first skid point to be sensed by a sensor (9,10; 11,12) on either wheel. A control module (13) responsive to signals from at least one of the sensors is operative to operate the latch valve and the skid control unit for the respective wheel. When a skid-signal is detected from a sensor on only one wheel the latch valve closes and the brake on the skidding wheel is released and re-applied when the skid signal terminates. The brake is re-applied in a fast first stage, due to pressure from an associated memory chanber and thereafter in a slower second stage due to the latch valve restricting the increase of braking pressure when it is closed. The rate of increase of brake pressure of the non-skidding wheel is restricted to that of the slow stage from the time that the latch valve is closed due to the other wheel skidding. The pressure in the memory chamber can decoy during a skid to compensate for pressure build up elsewhere in the system and so ensure that the pressure to which the brakes are applied in the first stage of brake re-application is not more than that at which the skid occurred.

14 Claims, 6 Drawing Sheets

FLUID-PRESSURE OPERATED ANTI-SKID BRAKING SYSTEMS FOR VEHICLES

This invention relates to improvements in fluid-pressure operated braking systems for vehicles of the kind in which operating fluid from a supply for actuating a wheel brake is supplied to the brake through a ski control unit interposed in a line between the supply and the brake, sensors provided to detect wheel skids and means responsive to a skid signal produced by any of the sensors are incorporated for operating valve means to relieve the pressure of the fluid supplied to the brake at a skid point, and the unit incorporates a memory chamber for storing a memory pressure dependant upon the brake pressure occurring at the skid point to provide a datum or knee point between first and second stages of brake re-application, the brake being re-applied in the first stage of brake re-application at a relatively higher rate than it is re-applied in the second stage of brake re-application, and the rate of brake re-application in said second stage being at a reduced rate in comparison to that at which the brake is applied before a skid point is detected. Such systems will hereinafter be referred to as "of the kind set forth".

In our U.S. Pat. No. 4,784,444 we have disclosed a fluid-pressure operated braking system of the kind set forth in which the brakes on the wheels at opposite ends of a common axle are each controlled by a separate skid control unit, and a single latch valve common to both units closes at the first skid point to be sensed by a sensor on either wheel, whereafter the rate of re-application of the two brakes is controlled in response to signals from the individual sensors, but at rates of pressure increase determined by the memory chamber of each respective unit, and by restricted flows of brake-applying fluid.

Specifically, in the system of U.S. Pat. No. 4,784,444, when a split $\mu$ situation arises, both brakes will be released at the same time, but the brake on the wheel which is first to recover is first re-applied through the two stages, followed by re-application of the brake on the other wheel when that wheel has recovered. It follows, therefore that there will be a reduction in pressure applied to the wheel on the surface of higher $\mu$, irrespective of whether or not the sensor on that wheel has emitted a skid signal.

In the preferred construction disclosed in U.S. Pat. No. 4,784,444 each skid control unit incorporates a solenoid-operated relay valve, and the latch valve is also operated by a solenoid, the wheel speed sensors producing signals which are fed into a control module which, in turn, is operative to supply an energising current to all three solenoids in response to a skid signal from one sensor, and thereafter to cause the solenoids of the relay valves to become de-energised to modulate control of the brakes individually, with the current maintained to the latch valve to hold it shut throughout that braking cycle.

According to our present invention in a fluid-pressure operated braking system of the kind set forth the brakes on the wheels at opposite ends of a common axle are each controlled by a separate skid control unit, a single latch valve is provided common to both units ad closes at the first skid point to be sensed by a sensor on either wheel, and a control module responsive to signals from at least one of the sensors is operative to operate the latch valve to control the rate of supply of brake-applying fluid from the supply, and to control the skid control units for the respective wheels in response only to the respective skid signals relating to the respective wheels which the skid control units control, independent of the skid signals relating to the other wheel on the axle.

Since a signal from either sensor is operative to close the latch valve, any increase in pressure from the supply and intended for a brake will be at a reduced rate of pressure increase as determined by the latch valve and irrespective of whether or not the respective skid control unit is also operative.

It follows, therefore, that when both wheels are travelling over surfaces of identical low $\mu$'s, both brakes will be released at the same time in response to signals from both sensors, and the brakes will then be re-applied in substantially similar sequences, namely in a first relatively rapid stage up to the knee point, determined by the memory pressure, followed by a second, slower stage by the restricted flow to each brake as determined by the latch valve.

When a split situation arises and only the sensor associated with the wheel on the surface of lower $\mu$ emits a signal, then the latch valve closes and the brake on the wheel on the surface of lower $\mu$ is released, the brake on the other wheel continuing to be applied but at a reduced rate of pressure increase as determined by the latch valve.

This has the advantage that there will be no reduction in the pressure applied to the brake on the wheel travelling over the surface of higher $\mu$, provided that no signal is emitted by the sensor associated with that wheel.

In a preferred construction each skid control unit incorporates a solenoid-operated relay valve, and the latch valve is also operated by a solenoid, the control module being operative to supply an energising current to the latch valve and to one of the relay valves in response to a signal from the respective sensor, and thereafter to cause the solenoid of the said one relay valve to become de-energised to modulate control of the respective brake, with the current maintained to the latch valve to hold it shut throughout that braking cycle.

We may also provide the memory chamber of each skid control unit with an associated memory pressure decay means which causes the memory pressure stored in the memory chamber to decay when a skid point is detected for the wheel associated with the respective skid control unit from an initial valve substantially equal to the brake-applying pressure immediately before the skid point was detected to a lower pressure.

The pressure to which the memory pressure decays is preferably dependent on the duration of the skid. The memory pressure decay means may comprise a restricted passage communicating the memory chamber with the downstream side of the latch valve. In our preferred construction it communicates the memory chamber with the upstream side of the relay valve.

One embodiment of our invention is illustrated in the accompanying drawings in which.

Figure 1:
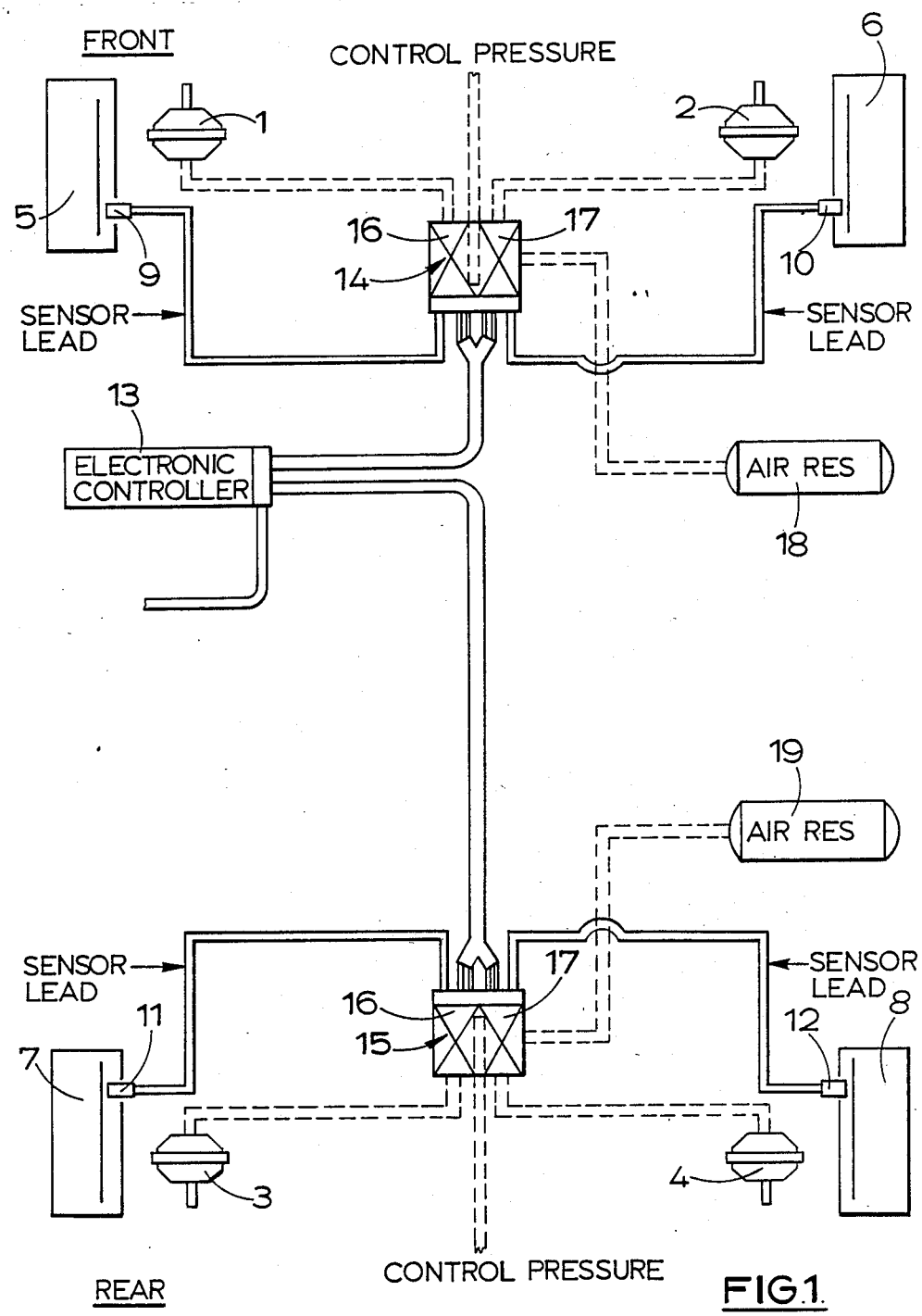
FIG. 1 is a layout of a two-axle vehicle provided with a relay-operated anti-skid pneumatic braking system.

The anti-skid pneumatic braking system illustrated in FIG. 1 of the drawings is similar to that of U.S. Pat. No. 4,784,444. In the anti-skid pneumatic braking system illustrated in FIG. 1 of the drawings brakes 1, 2, 3, 4 are provided on each of two front wheels 5, 6 on a first axle of a vehicle, and on two rear wheels 7, 8 on a second axle of the vehicle, respectively. Each wheel is provided with a respective speed sensor 9, 10, 11 and 12, and the output signals from the sensors are fed into an electronic control module 13 which differentiates the signals and emits energising currents for operating front and rear skid control units 14 and 15.

Each skid control unit 14, 15 controls the supply of operating pneumatic pressure under the control of a treadle valve 29 to a relay valve 16, 17 for each respective wheel, and each relay valve 16, 17 in turn, controls the supply of air under pressure from a reservoir 18, 19 to the brakes 1 and 2, and 3 and 4.

Figure 2:
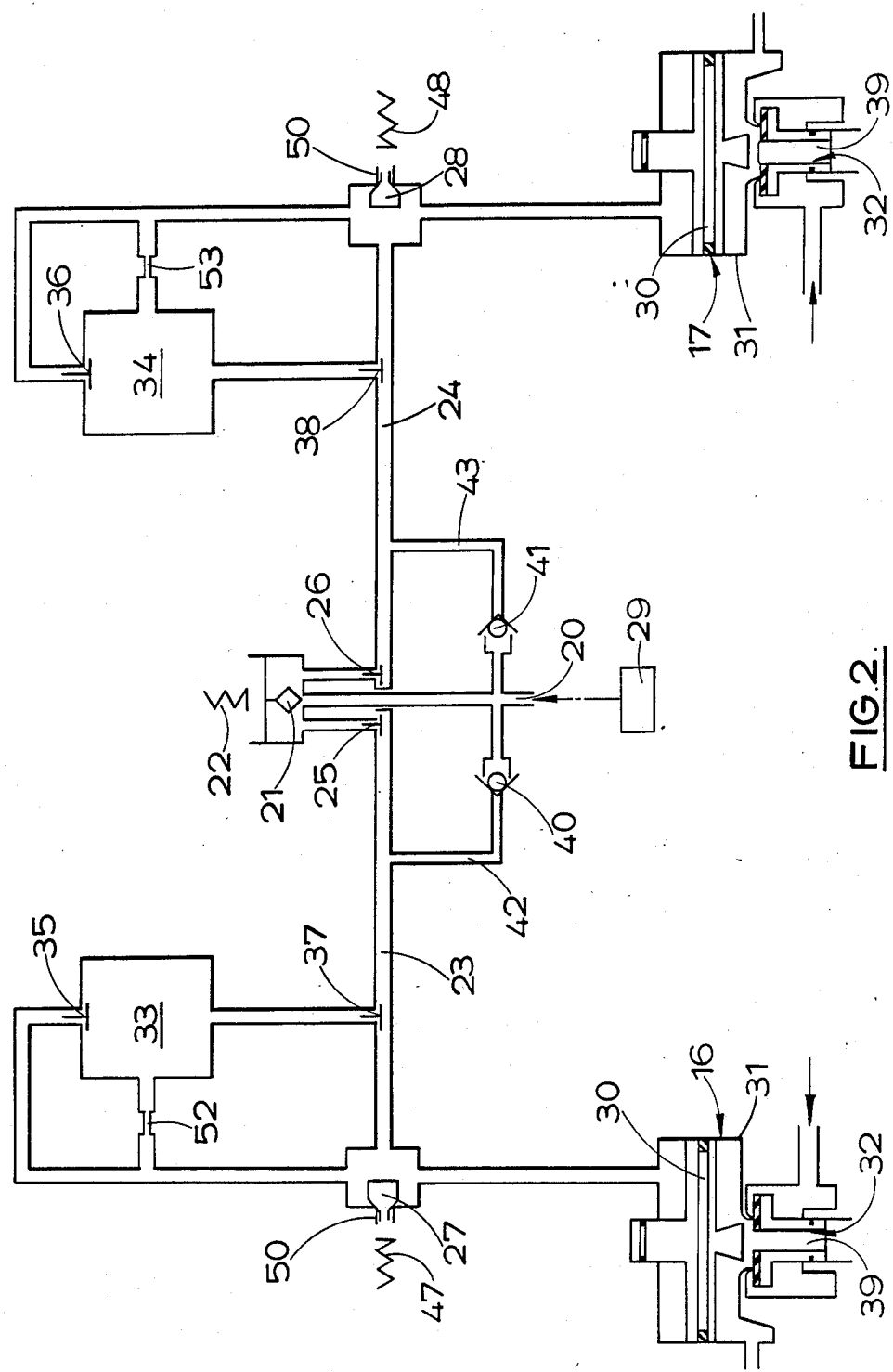
FIG. 2 is a schematic layout in more detail of the system arrangement for the rear axle.
Figure 4:
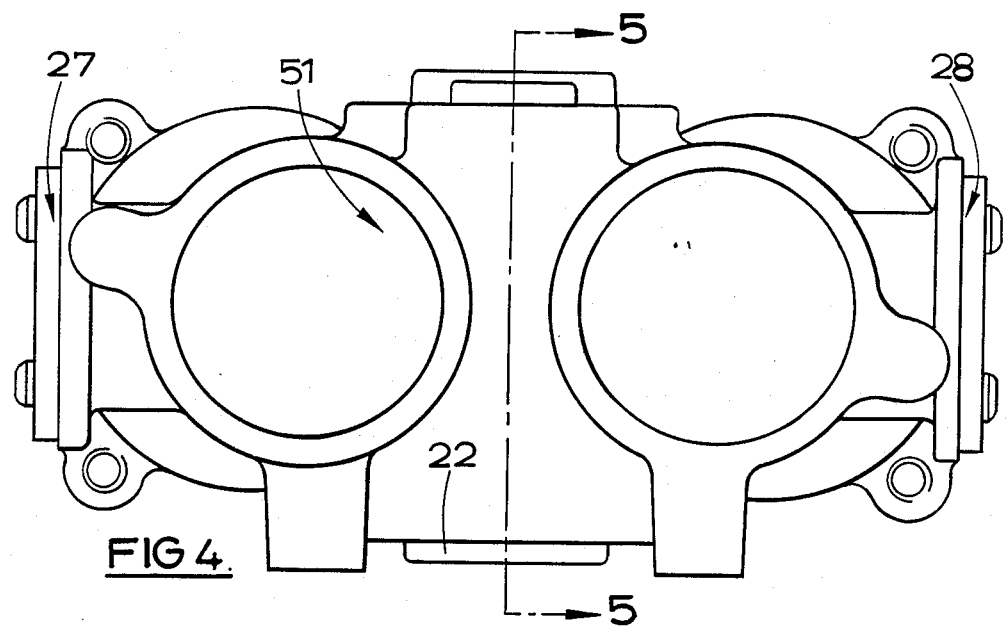
FIG. 4 is a end view of one practical form of control unit with all the valves and other components incorporated within a common housing.
Figure 5:
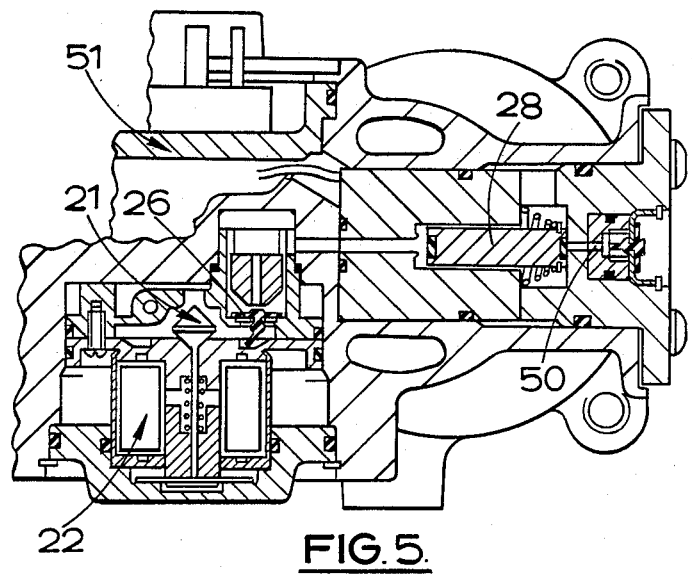
FIG. 5 is a section on the line 5—5 of FIG. 4.
Figure 6:
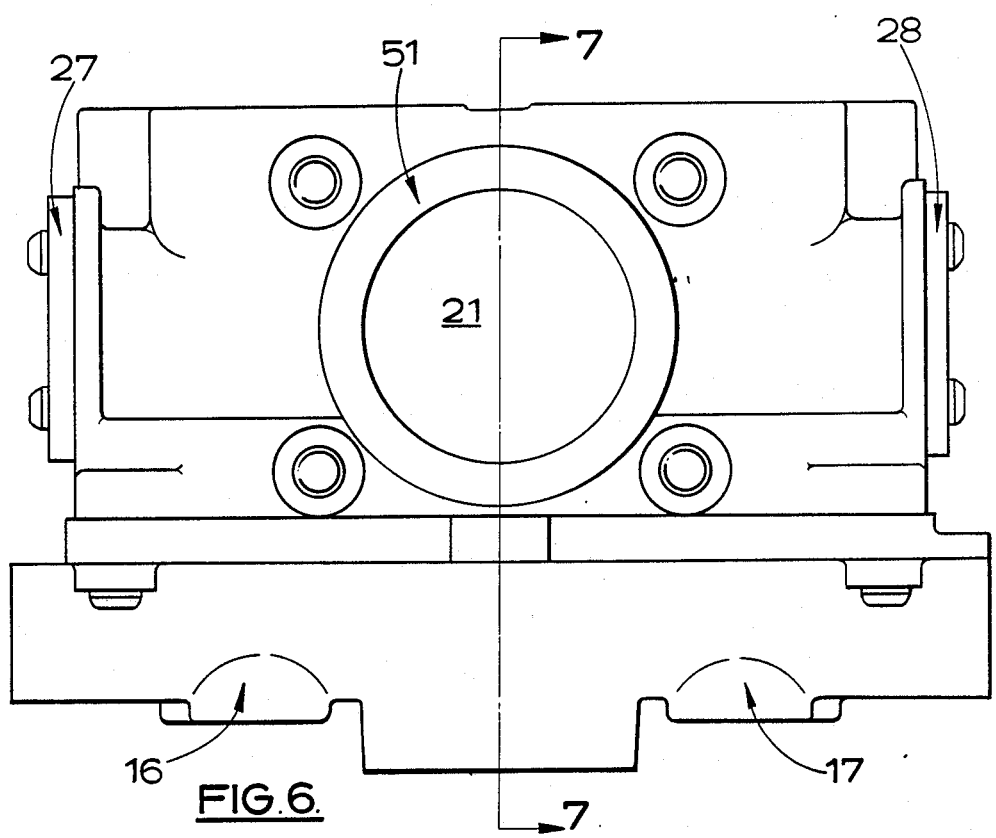
FIG. 6 is a plan of the unit.

The arrangement provided on the front axle is in accordance with U.S. Pat. No. 4,784,444, but the modified arrangement applied to the rear axle and as illustrated in FIG. 2 will be described. As illustrated FIG. 2 shows, schematically, the construction of the skid control unit 16 for the brakes 3, 4 on the rear axle.

As illustrated a control pressure from the treadle valve 29 is supplied to an inlet passage 20 and through a normally open latch valve 21, operated by a solenoid 22, to the two relay valves 16 and 17 through passages 23 and 24 respectively. A one-way valve 25, 26 respectively, and a solenoid-operated cut-off valve 27, 28, respectively, each incorporating a normally closed exhaust port, are located in each passage 23 and 24 between the latch valve 21 and the respective relay valve 16, 17.

Each relay valve 16, 17 is of known construction incorporating a piston 30 working in a bore 31 and operable, in response to the control pressure, to control a main valve 32 between the common reservoir 19, the respective brake 3, 4, and a central exhaust passage 39.

A memory chamber 33, 34 is disposed between each solenoid valve 27, 28 and a connection in the passage 23, 24 between the one-way valve 25, 26 and the solenoid valve 27, 28, and one-way valves 35, 36 and 37, 38 are provided between the solenoid-operated valves 27, 28 and the chambers 33, 34, and between the memory chambers 33, 34 and the passages 23, 24. Each memory chamber 33, 34 is provided with a restricted passage 52, 53, through which the pressure can decay at a slow rate towards the upstream side of the valves 27 and 28 respectively.

Finally a one-way valve 40, 41 is provided in a passage 42, 43 leading from the inlet passage 20 to each respective passage 23, 24 on the downstream side of the latch valve 21, between the two one-way valves 25, 37 and 26, 38 respectively.

Figure 8:
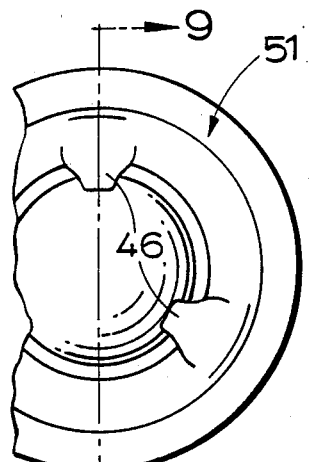
FIG. 8 is an end elevation of a one-way valve incorporated in the system and the control unit.
Figure 9:
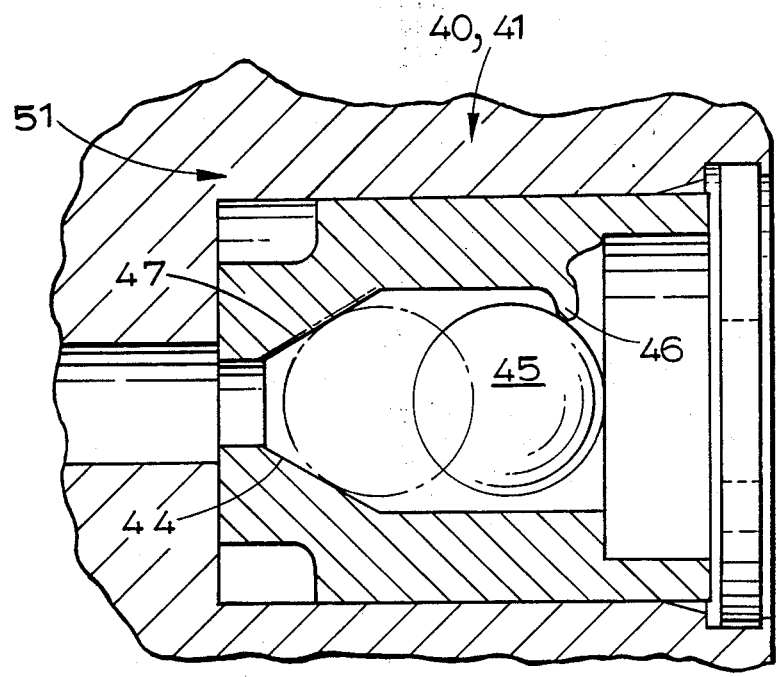
FIG. 9 is a section on the line 9—9 of FIG. 8.

Each one-way valve 40, 41 is illustrated on an enlarged scale in FIGS. 8 and 9 of the drawings. As illustrated each valve comprises a seating 44 of frusto-conical outline, and a valve member 45 in the form of a ball for engagement with seating 44. The movement of the ball 45 away from the seating is limited by three angularly spaced inwardly directed radial fingers 46 and, when the ball 45 is in engagement with the seating 44, a limited flow past the ball is permitted through a notch 47 in the seating 44.

As shown in FIGS. 4 to 7, all the valves 21, 40, 41, 35, 37, 36, 38, 27, 28, 16 and 17 and other components (33, 34) on each axle are housed and defined within a common housing 51.

The solenoid 22 of the latch valve and solenoids 47, and 48 of the valve 27 and 28 are adapted to be energised by a current from the control module 13. Specifically the control module 13 is arranged to energise the solenoid 22 and the solenoid 47 in response to a signal from the respective sensor 11, and separately to energise the solenoid 22 and the solenoid 48 in response to a signal from the sensor 12. When any such current is emitted, the solenoid 22 will be energised before, or simultaneously with, the respective solenoid 47 or 48.

In a normal inoperative position shown in FIG. 2 of the drawings, three solenoids 22, 47, and 48 are de-energised so that the latch valve 21 and the valves 47 and 48 are in the open position. Both relay valves 16, 17 are closed to isolate the brakes 3 and 4 from the reservoir 19.

Upon operation of the treadle valve 29 the control pressure is supplied to the inlet passage 20, and through the open latch valve 21, since the one way valves 40, 41 are closed by that pressure. The control pressure flows through the one-way valves 25 and 26, the passages 23 and 24, and the open valves 27 and 28 to act on the pistons 30 of the relay valves 16, 17. In addition the control pressure enters both memory chambers 33 and 34 through the respective one-way valves 35. The whole system is therefore subjected throughout to an equal control pressure.

The pressure acting on the pistons 30 causes both relay valves 16, 17 to operate in a known manner to supply air under pressure from the reservoir 19 to the actuators of the brakes in order to apply both brakes 3, 4 simultaneously. The pressure rises with time as shown in the portion A, B of the graph of FIG. 3.

Upon release of the treadle at the end of the braking cycle, air from the brakes 3, 4 is released to atmosphere through the exhaust passages 39, and the control pressure is released through the one-way valves 40 and 41 and an exhaust port on the treadle valve.

When the brakes 3, 4 are applied as described above and both wheels of the vehicle pass onto a surface of a low co-efficient of friction ($\mu$) which is sufficiently low for both sensors 11, 12 to emit skid signals substantially simultaneously, an equivalent energising current is emitted by the control module 13 to energise the three solenoids 22, 47 and 48 and thereby close the latch valve 21, and both valves 27 and 28.

Closure of the latch valve 21 isolates the direct flow of control pressure from the inlet passage 20 to the passages 23, and 24, but a restricted flow into the passages 23 and 24 still takes place through the notches 47 in the seatings 44 of the one-way valve 40, 41.

Closure of the valves 27, 28 isolates the passages 23 and 24 from the relay valves 16 and 17, which close by the exhaustion to atmosphere through the exhaust port 50 of the control pressures acting on the pistons 30. The pressure then drops from point B as shown in FIG. 3.

Due to the presence of the one-way valve 35, 36, a memory pressure is trapped in each memory chamber, and that pressure is equal to the value of the control pressure applied to the pistons 30 when the skid signals were emitted by the sensors 11, 12 at the skid point. However, the pressure in each memory chamber 33, 34 is permitted to decay at a rate determined by flow through the respective restricted passage 52, 53, which rate of decay is matched to the rate at which the pressure applied to the relay valves 17, 18 during the first stage of brake re-application would otherwise increase due to the restricted flow of control pressure through the notch 47 increasing the pressure in the passages 23, 42 and 24, 41 upstream of valves 27, 28.

Figure 3:
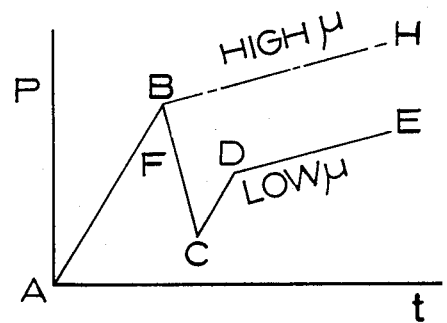
FIG. 3 is a performance graph.
Figure 7:
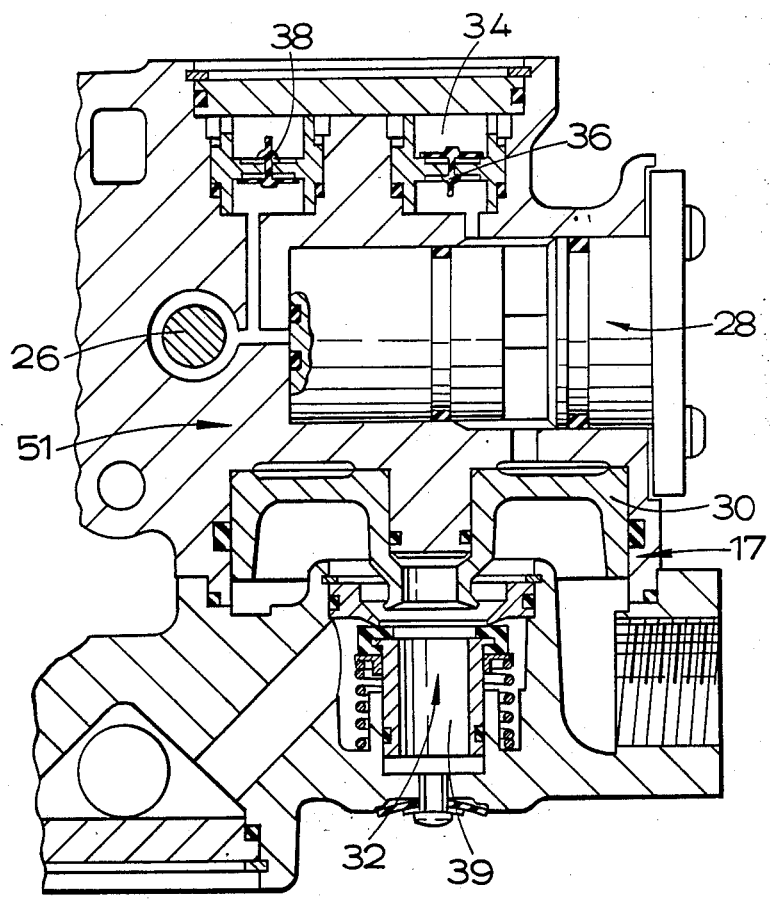
FIG. 7 is a section on the line 7—7 of FIG. 6.

When each wheel recovers and the skid signals are cancelled, say when the brake pressure has reduced to point C in FIG. 3, indicative that the quality of the road surface has improved sufficiently for the brakes 7, 8 to be re-applied, the control module 13 cuts-off the energising current to the two solenoids 47, 48 so that these two valves open again, but the solenoid 22 remains energised to hold the latch valve 21 in its closed position.

Opening the valves 27, 28 enables the pressures trapped in the memory chambers 33, 34 to be released through the one-way valves 37, 38 to act on the pistons 30 and act as application pressures to cause the relay valves 16, 17 to operate again to re-apply the brakes 3, 4 as described above.

Since the volumes of the chambers 33, 34 have to fill the remainder of the passages and the spaces in the bores 31 above the pistons 30, known as the application chambers, such volumes will only be sufficient to raise the brake pressure rapidly in a first stage up to a knee or changeover point D, as shown in FIG. 3, which is lower than the said point B. Thereafter the brakes are re-applied, in a second stage, but at a rate of pressure increase slower than that of the first, by the flow to the relay valves 16, 17 of a restricted flow of fluid through the notches 47 in the seatings of the one-way valves 40, 41. This is depicted in the graph of FIG. 3 by the line D E.

The restricted passages 52, 53 ensure that the pressures in the memory chamber 33, 34 have not increased, which otherwise might cause the brakes to be re-applied in the first stage to a point in excess of the desired point D. Should the skid last for a significant period of time the pressure in passages 42, 43, and 23, 24, will increase due to restricted flow past one way valves 40, 41. The decay passages 52, 53 enable the pressure in the memory chambers to decrease during the skid to compensate for the build up in pressure in the passages upstream of the relay valves 27, 28. Thus any tendency for such "overshoot" to occur is avoided and we maintain the height of point D constant independent of the duration of the skid.

Should a further skid condition occur during the application of the brakes in a common cycle, then the sequence of brake release, and brake re-application as described above, will be repeated.

When the brakes are applied as described above, and one wheel, say the wheel 7, passes onto a surface of low μ with the other wheel travelling over a surface of high μ, a so-called split μ situation arises.

Provided the surface of high μ is sufficiently high for no skid signal to be emitted by the sensor 12, only the sensor 11 will emit a skid signal, in response to which the control module 13 energises the solenoid 22, and the solenoid 47 to close the latch valve 21, and the valve 27.

The pressure applied to the brakes 3 is then relieved as described above.

Since no skid signal had been emitted by the speed sensor 12, the solenoid 48 remains de-energised and the brake 4 continues to be applied. However any increase in pressure applied to the brake 4 is controlled by a control pressure which can increase only at a rate determined by flow through the notch 47 in the one-way valve 41, due to closure of the latch valve 21, which occurs at the skid point B. Thus, such a rate of pressure increase from B to H is equivalent to that normally experienced in a second stage of brake re-application, as indicated in the graph of FIG. 3 by the portion shown from D to E.

The control module 13 is arranged to take into account the behaviour of all the wheels, and a latch valve 21 on each axle, when closed during a skid cycle, will remain closed until the control module 13 has demanded, from information from all four speed sensors 9, 10, 11 and 12, that the vehicle has moved onto a sufficiently good surface for the anti-lock system to be de-activated, and for the latch valves 21 to re-open.

Naturally the release of the brakes at the end of a braking cycle will de-activate the anti-lock system.

The one-way valves 25, 26 are provided to ensure that the two brake circuits on each axle are separate from each other, and there can be no mixing of the air on the two circuits, particularly after the latch valve 21 has closed.

The arrangement described above for the brakes on the rear axle may also be provided for the brakes on the front axle.

We may choose to arrange the memory pressure decay means 52, 53 such that the longer the duration of the skid the lower the knee point D to which the brakes are eventually re-applied in a first stage of brake re-application. This may in any case occur in a very long skid if the pressure in passage 23, 42; 24, 33 reaches the maximum pressure that the supply 29 can achieve whilst the memory pressure continues to decrease.

We claim:

1. A fluid-pressure operated braking system for vehicles comprising first and second wheels provided at each end of a common axle, first and second wheel brakes for said first and second wheels respectively, a supply for providing brake-applying operating fluid to each wheel brake, an operating fluid supply line between said supply and each said brake, respective first and second separate independently operable skid control units interposed respectively in said brakes, first and second sensors provided for said first and second wheels respectively to detect the skid point of wheel skids relating to their respective wheels and to provide a skid signal when a skid point is detected, means responsive to a skid signal produced by either of said first or said second sensors, valve means provided to relieve independently the pressure of the fluid supplied to said first and second brakes at a skid point, each said skid control unit comprising a part of a control fluid circuit and each incorporating a memory chamber for storing a memory pressure dependant upon the brake pressure occurring at said skid point to provide a datum or knee point between first and second stages of brake re-application, said valve means being controlled by said means responsive to a skid signal said first and second brakes on said respective first and second wheels each being controlled by a respective one of said separate independently operable skid control units, and a single latch valve provided common to both units, said latch valve closing at the first skid point to be sensed by said first sensor or said second sensor, whereafter the rates of re-application of said first and said second brakes are independently controlled in response to signals from the first and second sensors respectively at a respective initial rate and thereafter at a subsequent rate, said initial rate of brake pressure increase of said first brake being determined by said memory chamber of said first skid control unit and said initial rate of brake pressure increase of said second brake being determined by said memory chamber of said second skid control unit, said subsequent rate of brake re-application being controlled by restricted flows of said brake-applying fluid, wherein each of said first and said second skid-control units is independently controlled by control means in response only to corresponding skid signals relating to the first and second wheels respectively.

2. A braking system according to claim 1, wherein when said first and second wheels are travelling over surfaces of different co-efficient of friction and one of said wheels skids during a braking operation whilst the other wheel does not skid, said control means controls said common latch valve so as close said common latch valve to provide a restricted flow of brake-operating fluid from the supply, controls said skid control unit on the one wheel so as to relieve the braking pressure in the brake of said one wheel until that wheel has stopped skidding, and controls said skid control unit of said other wheel so as to continue to apply the brake on said other wheel but at the rate of said second stage of brake re-application, the brake of said one wheel being re-applied in said first and second stages when said one wheel has stopped skidding, there being substantially no reduction in the pressure applied to the brake of said other wheel when said common latch valve is closed.

3. A braking system according to claim 1 wherein each said skid control unit incorporates a solenoid-operated relay valve, and said control means is operative to supply an energising current to said latch valve and to one of said relay valves in response to a skid signal from the respective said sensor, and thereafter to cause said solenoid of the said one relay valve to become de-energised to modulate control of the respective brake, with the current maintained to said latch valve to hold it shut throughout that braking cycle.

4. A braking system according to claim 1 wherein a latch-bypass passage is provided having a latch-bypass valve and communicates said supply with a point in said line downstream of said latch valve, and flow of fluid at the reduced rate when said latch valve is closed occurs through said latch-bypass passage.

5. A braking system according to claim 1 wherein said memory chamber of each skid control unit has an associated memory pressure decay means which causes said memory pressure stored in said memory chamber to decay when a skid point is detected for said wheel associated with the respective skid control unit from an initial value substantially equal to that of the brake-applying pressure immediately before said skid point was detected to a lower pressure.

6. A braking system according to claim 5 wherein said memory pressure decay means is arranged such that the pressure to which said memory pressure decays during a skid is dependent on the duration of said skid.

7. A braking system according to claim 5 wherein said memory pressure decay means comprises a restricted passage communicating its memory chamber with the downstream side of the latch valve.

8. A braking system according to claim 5 wherein a latch-bypass passage having a latch-bypass valve communicates said supply with a point in said line downstream of said latch valve, and flow of brake-operating fluid at the reduced rate occurs when said latch valve is closed through said latch-bypass passage, and wherein the rate of decay of memory pressure in said memory chamber during a skid substantially balances the rate of increase in pressure of the brake-operating fluid which flows past the latch-bypass valve during said skid so that the pressure of said knee point is substantially constant independent of the duration of said skid.

9. A fluid-pressure operated braking system for vehicles comprising a wheel, a brake for braking said wheel, a fluid-operated brake actuator for applying said brake, a supply of brake-operating fluid for supplying said actuator with brake-operating fluid, a skid control unit interposed in a line between said supply and said brake, sensors provided to detect a skid point, means responsive to a skid signal produced by any of the sensors incorporated for operating valve means to relieve the pressure of the fluid supplied to said brake at a skid point, said unit having first means for re-applying said brake in a first stage of brake re-application and second means for re-applying said brake in a second stage of brake re-application, said first means incorporating a memory chamber for storing a memory pressure dependent upon the pressure of control fluid occurring at said skid point to provide a datum or knee point between said first and second stages of brake re-application, said first and second means controlling the re-application of said brake by said actuator such that said first stage of brake re-application is at a relatively higher rate than said second stage of brake re-application, and wherein said second means controls the rate of brake re-application in said second stage to be at a reduced rate in comparison to that at which the brake is applied before said skid point is detected by said sensors, said skid control unit further comprising pressure decay means associated with said memory chamber, said memory pressure decay means causing said memory pressure stored in said memory chamber to decay when said skid point is detected from an initial value substantially equal to that of the brake-operating pressure immediately before said skid point was detected to a lower pressure, and wherein a passage communicates said memory chamber with said supply, and an isolating valve for isolating said memory chamber from said supply is provided in said passage, the portion of said passage extending between said supply and said isolating valve comprising a connection portion of said passage, and wherein when a skid signal is detected for said wheel said skid control unit closes said isolating valve to isolate said memory chamber from said supply and said connection portion continues to be pressurized by said supply during said skid, said memory pressure decay means allowing said memory pressure to decay at a rate which substantially balances and counteracts the pressure increase in said connection portion during said skid so as to compensate upon brake re-application in said first stage for the pressurisatior of said connection portion so that the pressure reduction in said memory chamber and the pressure increase in said connection portion substantially cancel each other out during said firsty stage or rake re-application thereby maintaining the pressure of said knee point of said control fluid applied in said first stage of brake re-application substantially constant, independent of the duration of said skid.

10. A braking system according to claim 9, wherein means is provided to control the flow of control fluid between said source and said connection portion such that after a skid signal has been detected said connection portion is pressurized at said reduced gate of brake re-application.

11. A braking system according to claim 9 wherein a latch valve controls the flow of operating fluid between said source of operating fluid and said skid control unit, closure of said latch valve restricting flow of operating fluid from said source to said unit to said reduced rate of said second stage of brake re-application.

12. A braking system according to claim 11, wherein said memory pressure decay means comprises a restricted passage communicating said memory chamber with the downstream side of said latch valve.

13. A braking system according to claim 11 wherein said memory pressure decay means comprises a restricted passage communicating said memory chamber with the upstream side of a relay valve incorporated in said skid control unit.

14. A fluid-pressure operated braking system for vehicles comprising a wheel, a brake for braking said wheel, a fluid-operated bake actuator for applying said brake, a supply of brake-operating fluid for supplying said actuator with brake-operating fluid, a skid control unit interposed in a line between said supply and said brake, sensors provided to detect a skid point, means responsive to a skid signal produced by any of the sensors incorporated for operating valve means to relieve the pressure of the fluid supplied to said brake at a skid point, said unit having first means for re-applying said brake in a first stage of brake re-application and second means for re-applying said brake in a second stage of brake re-application, said first means incorporating a memory chamber for storing a memory pressure dependent upon the pressure of control fluid occurring at said skid point to provide a datum or knee point between said first and second stages of brake re-application, said first and second means controlling the re-application of said brake by said actuator such that said first stage of brake re-application is at a relatively higher rate than said second stage of brake re-application, and wherein said second means controls the rate of brake re-application in said second stage to be at a reduced rate in comparison to that at which the brake is applied before said skid point is detected by said sensors, said skid control unit further comprising pressure decay means associated with said memory chamber, said memory pressure decay means causing said memory pressure stored in said memory chamber to decay when said skid point is detected from an initial value substantially equal to that of the brake-operating pressure immediately before said skid point was detected to a lower pressure, and wherein a latch valve is provided and controls the flow of operating fluid between said source of operating fluid and said skid control unit, closure of said latch valve restricting flow of operating fluid from said source to said unit to said reduced rate of said second stage of brake re-application, and wherein first and second brakes on opposite ends of a common axle are provided and are each controlled by a respective separate said skid control unit, and a single latch valve common to both units closes at the first skid point to be sensed by a sensor on either wheel, whereafter re-application of said first and second brakes is respectively controlled in response to signals from their respective sensors, but at individual rates of pressure increase determined by said memory chambers of the respective said units, and by restricted flows of brake-applying fluid, and wherein each memory chamber has its own independent memory pressure decay means.

* * * * *